(12) United States Patent
Wang et al.

(10) Patent No.: US 12,294,579 B2
(45) Date of Patent: May 6, 2025

(54) AUTHENTICATION METHOD AND APPARATUS, DEVICE, AND STORAGE MEDIUM

(71) Applicant: ZTE CORPORATION, Guangdong (CN)

(72) Inventors: Peng Wang, Guangdong (CN); Liyong Cai, Guangdong (CN); Chen Song, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 364 days.

(21) Appl. No.: 18/012,722

(22) PCT Filed: Jun. 21, 2021

(86) PCT No.: PCT/CN2021/101360
§ 371 (c)(1),
(2) Date: Dec. 23, 2022

(87) PCT Pub. No.: WO2021/259216
PCT Pub. Date: Dec. 30, 2021

(65) Prior Publication Data
US 2023/0262060 A1   Aug. 17, 2023

(30) Foreign Application Priority Data
Jun. 23, 2020   (CN) .......................... 202010583857.6

(51) Int. Cl.
*H04Q 11/00*   (2006.01)
*H04L 9/40*   (2022.01)

(52) U.S. Cl.
CPC ..... *H04L 63/0876* (2013.01); *H04Q 11/0067* (2013.01)

(58) Field of Classification Search
CPC .................................................. H04Q 11/0067
See application file for complete search history.

(56) References Cited

U.S. PATENT DOCUMENTS

2010/0034534 A1* 2/2010 Niibe .................. H04J 14/0252
398/25

FOREIGN PATENT DOCUMENTS

| CN | 101615927 A | 12/2009 |
|----|-------------|---------|
| CN | 101888268 A | 11/2010 |

(Continued)

OTHER PUBLICATIONS

Chinese Office Action and Search Report issued in CN Application No. 202010583857.6, dated May 17, 2024, 18 pages.

(Continued)

*Primary Examiner* — Shi K Li
(74) *Attorney, Agent, or Firm* — KDW Firm PLLC

(57) ABSTRACT

Provided are an authentication method and apparatus, a device, and a storage medium. The method includes, if an optical line terminal operates in at least two bands, setting at least one low-delay band and at least one non-low-delay band; after receiving, in a non-low-delay band, a first serial number sent by an optical network unit (ONU) or an auxiliary authentication device, acquiring an equalization delay; after receiving, in the non-low-delay band, an authentication request sent by the ONU or the auxiliary authentication device, determining an ONU identifier according to the first serial number or a second serial number of the ONU in a low-delay band, where the second serial number is sent by the ONU in the non-low-delay band; and authenticating the ONU according to the ONU identifier and the equalization delay.

20 Claims, 7 Drawing Sheets

(56) References Cited

FOREIGN PATENT DOCUMENTS

| | | |
|---|---|---|
| CN | 102223586 A | 10/2011 |
| CN | 103401632 A | 11/2013 |
| CN | 103973389 A | 8/2014 |
| CN | 107615715 A | 1/2018 |
| CN | 111064542 A | 4/2020 |
| CN | 112235662 A | 1/2021 |
| EP | 3288221 A1 | 2/2018 |
| EP | 3985893 A1 | 4/2022 |
| JP | 2012147244 A | 8/2012 |
| JP | 2012526424 A | 10/2012 |
| JP | 2016511981 A | 4/2016 |
| WO | WO-2013104987 A1 * | 7/2013 ............ H04L 63/08 |
| WO | 2016190302 A1 | 12/2016 |
| WO | 2018170836 A1 | 9/2018 |
| WO | 2020063583 A1 | 4/2020 |
| WO | 2021008224 A1 | 1/2021 |

OTHER PUBLICATIONS

International Search Report dated Aug. 30, 2021, for Application No. PCT/CN2021/101360 (four (4) pages).
Extended European Search Report for EP Application No. 21830091.1, dated Jun. 20, 2024, 13 pages.
Japanese Office Action for Application No. 2022579881 dated Feb. 13, 2024.

* cited by examiner

AUTHENTICATION METHOD AND APPARATUS, DEVICE, AND STORAGE MEDIUM

CROSS-REFERENCE TO RELATED APPLICATIONS

This is a National Stage Application, filed under 35 U.S.C. 371, of International Patent Application No. PCT/CN2021/101360, filed on Jun. 21, 2021, which claims priority to Chinese Patent Application No. 202010583857.6 filed on Jun. 23, 2020, the disclosures of which are incorporated herein by reference in their entireties.

TECHNICAL FIELD

The present application relates to the field of communications and, particularly, an authentication method and apparatus, a device, and a storage medium.

BACKGROUND

With the development of optical networks, fiber-to-the-home (FTTH) has been fully spread, and its terminal products, optical network units (ONUs), have been widely used. In a passive optical network system, there are typically four types of delays. One is an optical path transmission delay. The delay of a 1-km optical fiber is about 5 us. The longer an optical fiber is, the larger the delay is. An optical path transmission delay may be optimized by line deployment. One is a bandwidth allocation delay. A bandwidth allocation delay may be optimized by a reduction in a bandwidth allocation period and an allocation of some fixed bandwidths. One is an internal delay of a system. The internal delay of the system is an inherent delay inside an optical line terminal (OLT) and an optical network unit and requires to be optimized at a chip design stage. One is a quiet window delay. Here the window is mainly used for ONU serial number (SN) reporting and ONU ranging. The window opening size is related to the distance measured by an OLT. Generally, a window opening delay is increased by 200 us every 20 km.

The window opening size at the serial number request stage of an optical line terminal is (2+48+n*200) us. Here 2 us is the response time of an ONU, 48 us is a random delay of an ONU, n*200 us denotes a loop delay, and n denotes the ratio of a logic distance measured by an OLT to 20 km. The window opening size at the stage of ranging by an OLT is (2+n*200) us. Here 2 us is the response time of the ONU, n*200 us is the loop delay, and n denotes the ratio of the logic distance measured by the OLT to 20 km. Since an OLT requires to find a newly authenticated ONU or newly-connected ONU, an SN request window requires to be opened periodically. The shorter the opening period is, the greater the impact on the delay of a Combo passive optical network (PON) system is, being adverse to a reduction in the delay of the communication system of an operator.

SUMMARY

Embodiments of the present application provide an authentication method. The method includes setting at least one low-delay band and at least one non-low-delay band if an optical line terminal operates in at least two bands; after receiving a first serial number sent by an optical network unit (ONU) or an auxiliary authentication device in the non-low-delay band, acquiring an equalization delay; after acquiring an authentication request sent by the ONU or the auxiliary authentication device in the non-low-delay band, determining an ONU identifier according to the first serial number or a second serial number of the ONU in the low-delay band sent by the ONU in the non-low-delay band; and authenticating the ONU according to the ONU identifier and the equalization delay.

Embodiments of the present application provide an authentication method. The method includes sending a first serial number to an optical line terminal (OLT) in a non-low-delay band; sending an authentication request to the OLT in the non-low-delay band; sending acknowledgement information to the OLT after acquiring an equalization delay and an ONU identifier sent by the OLT, where the ONU identifier is determined according to the first serial number or a second serial number of an ONU in a low-delay band sent by the ONU in the non-low-delay band.

Embodiments of the present application provide an authentication apparatus. The apparatus includes a setting module configured to set at least one low-delay band and at least one non-low-delay band if an optical line terminal operates in at least two bands; an acquisition module configured to acquire an equalization delay after receiving a first serial number sent by an optical network unit (ONU) or an auxiliary authentication device in the non-low-delay band; a determination module configured to determine an ONU identifier according to the first serial number or a second serial number of the ONU in the low-delay band sent by the ONU in the non-low-delay band after receiving the authentication request sent by the ONU or the auxiliary authentication device in the non-low-delay band; and an authentication module configured to authenticate the ONU according to the ONU identifier and the equalization delay.

Embodiments of the present application provide an authentication apparatus. The apparatus includes a first sending module configured to send a first serial number to an optical line terminal (OLT) in a non-low-delay band; a second sending module configured to send an authentication request to the OLT in the non-low-delay band; and a third sending module configured to send acknowledgement information to the OLT after acquiring an equalization delay and an ONU identifier sent by the OLT, where the ONU identifier is determined according to the first serial number or a second serial number of the ONU in a low-delay band, and the second serial number is sent by the ONU in the non-low-delay band.

The present application provides a device. The device includes one or more processors and a storage apparatus configured to store one or more programs. When one or more programs are executed by one or more processors, one or more processors are able to implement the method provided by embodiments of the present disclosure.

Embodiments of the present application provide a storage medium, where a computer program is stored. The computer program is executed by a processor to implement the method provided by any of embodiments of the present applications.

With respect to the above embodiments and other aspects of the present application, as well as implementations thereof, further explanation is provided in the drawings, detailed description, and claims.

DETAILED DESCRIPTION

The object, technical solution and advantages of the present application will be clearer from a detailed description of embodiments of the present application in conjunction with drawings. It is to be noted that if not in collision, the embodiments and features therein in the present application may be combined with each other.

The steps illustrated in the flowcharts of the drawings may be performed by a computer system such as a group of computers capable of executing instructions. Although logical sequences are shown in the flowchart, the shown or described steps may be performed in sequences different from those described herein in some cases.

The present application proposes an authentication method and apparatus, a device, and a storage medium.

Figure 1:
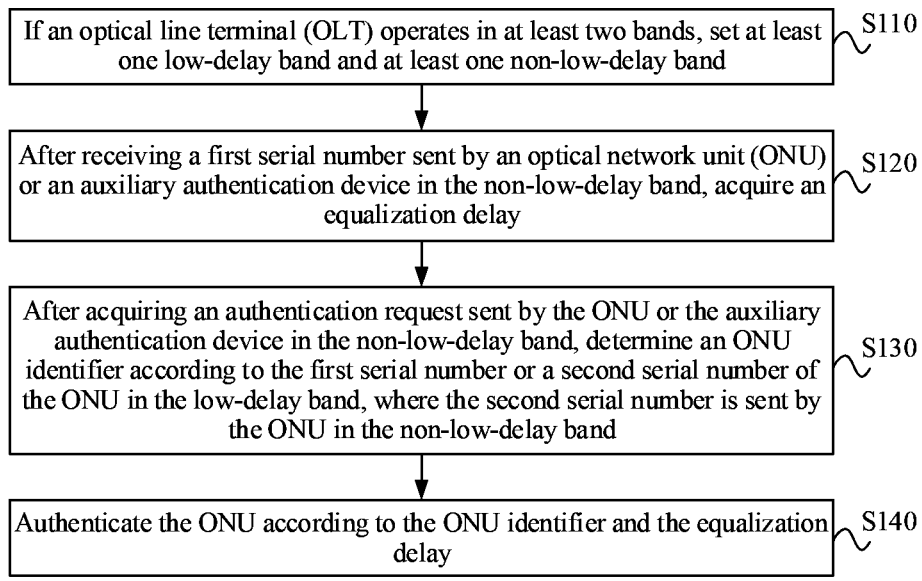
FIG. 1 is a flowchart of an authentication method according to an embodiment of the present application.

In an example embodiment, FIG. 1 is a flowchart of an authentication method provided by the present application. The method may be applicable to the scenario where an optical line terminal authenticates a newly-connected optical network unit. The method may be performed by an authentication apparatus. The authentication apparatus may be implemented in software and/or hardware and integrated into a device. The device may be a computer device.

As shown in FIG. 1, the authentication method provided by the present application includes S110, S120, S130, and S140.

In S110, if an optical line terminal operates in at least two bands, at least one low-delay band and at least one non-low-delay band are set.

In an embodiment, if the system in which the OLT and an ONU are located is a multi-band system, the OLT operates in at least two bands, and the ONU may operate in one band and does not support band switching, or the ONU may also operate in one band and support the band switching, or the ONU may also operate in multiple bands at the same time. For example, if the system in which the OLT and the ONU are located is a Combo PON system, the OLT supports 1310 nm band for uplink/1490 nm band for downlink, and 1270 nm band for uplink/1577 nm band for downlink, and the ONU may operate in only one of the bands and does not support the band switching. If the system in which the OLT and the ONU are located is an NGPON2 PON system, the OLT and the ONU may support at most eight bands among 1532.68-1538.19 nm band for uplink/1596.34-1602.31 nm band for downlink; the ONU may operate in only one band, and the OLT may notify, through a Tuning_Control message, the ONU to perform the band switching. If the system in which the OLT and the ONU are located is a 50G PON and 100G PON system, generally implemented by n*25G, where n represents the number of bands, that is, in the 50G PON system, the OLT and the ONU support at most two bands at the same time, and in the 100G PON system, the OLT and the ONU support at most four bands at the same time.

In the scenario where the OLT may operate in at least two bands, at least one low-delay band and at least one non-low-delay band may be preset first so that the ONU operates in a low-delay band to enable a shorter delay. However, the ONU cannot perform serial number reporting in the low-delay band and may perform the serial number reporting only in a non-low-delay band.

In S120, after a first serial number sent by the ONU or an auxiliary authentication device is received in the non-low-delay band, an equalization delay (EQD) is acquired.

If the system in which the OLT and the ONU are located is a Combo PON system, the ONU may operate in only one band and does not support the band switching, since the ONU cannot report a serial number when operating in the low-delay band, an auxiliary authentication device requires to be added. In this case, the auxiliary authentication device sends the first serial number to the OLT in the non-low-delay band. If the system in which the OLT and the ONU are located is an NGPON2 PON system, the ONU may operate in only one band, and the OLT may notify, through the Tuning_Control message, the ONU to perform the band switching, the ONU may operate in the non-low-delay band first and report the first serial number in the non-low-delay band. If the system in which the OLT and the ONU are located is a 50G PON and 100G PON system, the ONU may support two bands at the same time, so the ONU reports the first serial number in the non-low-delay band. However, since the ONU may operate in two bands at the same time, the first serial number reported by the ONU may be different from a second serial number of the ONU in the low-delay band, and thus the ONU requires to send, in the non-low-delay band, the second serial number of the ONU in the low-delay band after the ONU goes online.

After receiving the first serial number sent by the ONU, the OLT sends a ranging request to the ONU. After receiving the ranging request, the ONU sends an uplink optical signal to the OLT. The OLT calculates the equalization delay according to the time the uplink optical signal is received and the time the ranging request is sent to the ONU. After receiving the first serial number sent by the auxiliary authentication device, the OLT sends the ranging request to the auxiliary authentication device.

The equalization delay may be acquired as follows: If the system in which the ONU is located is a Combo PON system, the ONU may operate in only one band and does not support the band switching, the first serial number requires to be reported in another non-low-delay band by the auxiliary authentication device first. In this case, after receiving the first serial number, the OLT sends the ranging request to the auxiliary authentication device, and the OLT performs ranging to obtain the equalization delay. The equalization delay may also be acquired as follows: If the system in which the ONU is located is an NGPON2 PON system, the ONU may operate in only one band and support the band switching, a newly-connected ONU may report an SN in the non-low-delay band. The OLT sends a ranging request to the ONU after receiving the SN. The ONU sends an uplink optical signal after receiving the ranging request. The OLT calculates the equalization delay according to the time the uplink optical signal is received and the time the ranging request is sent to the ONU. If the system in which the ONU is located is a 50G PON and 100G PON system, in the 50G PON system, the OLT and the ONU may support at most two bands at the same time, and in the 100G PON system, the OLT and the ONU may support at most four bands at the same time. A newly-connected ONU may report an SN in the non-low-delay band first. In this case, after receiving the SN, the OLT may send a ranging request to the ONU. After the ONU receives the ranging request, the ONU sends an uplink optical signal to the OLT. After receiving the uplink optical signal, the OLT calculates the equalization delay according to the time the uplink optical signal is received and the time the ranging request is sent to the ONU.

The ONU may send the serial number in the low-delay band in such a manner that the ONU notifies the OLT of the serial number in the low-delay band through a private physical layer operation administration and maintenance (PLOAM) message or an ONU management and control interface (OMCI) message.

If the system in which the OLT and the ONU are located is a 50G PON and 100G PON system, the ONU may operate in multiple bands at the same time, so the ONU may report the first serial number in the non-low-delay band first. After the OLT receives the first serial number, the OLT sends a ranging request to the ONU. The ONU sends an uplink optical signal after receiving the ranging request. The OLT calculates the equalization delay according to the time the uplink optical signal is received and the time the ranging request is sent to the ONU. The ONU sends the serial number to the OLT in the non-low-delay band. After receiving an authentication request sent by the ONU, the OLT periodically sends an ONU identifier and the equalization delay in the low-delay band. The ONU sends acknowledgement information to the OLT after receiving the ONU identifier and the equalization delay. The OLT starts to perform normal OMCI message interaction and service channel configuration flow after receiving the acknowledgement information.

It is be noted that since the system in which the OLT and the ONU are located is the 50G PON and 100G PON system, the ONU may operate in multiple bands at the same time, so a case may occur in which the serial number of the ONU in the non-low-delay band is different from the serial number of the ONU in the low-delay band, in this case, the serial number of the ONU in the non-low-delay band requires to be sent to the OLT.

In S130, after the authentication request sent by the ONU or the auxiliary authentication device in the non-low-delay band is received, the ONU identifier is determined according to the first serial number or a second serial number of the ONU in the low-delay band. The second serial number is sent by the ONU in the non-low-delay band.

The ONU identifier is ONU_ID, and the ONU identifier is determined according to the first serial number or the second serial number.

The authentication request sent by the ONU may be sent by the ONU through a private PLOAM message or an OMCI message to notify the OLT that a newly-connected ONU requires to be authenticated in the low-delay band. The authentication request may be sent by the auxiliary authentication device in such a manner that the OLT is notified through a private PLOAM message or an OMCI message that a newly-connected ONU requires to be authenticated in the low-delay band.

In S140, the ONU is authenticated according to the ONU identifier and the equalization delay.

The ONU is authenticated according to the ONU identifier and the equalization delay. After receiving the authentication request sent by the ONU, the ONU identifier and the equalization delay may be sent periodically in the low-delay band. For example, the ONU may notify the OLT that the newly-connected ONU requires to be authenticated in the low-delay band, after acquiring the equalization delay and the serial number, the OLT periodically sends Assign_ONU_ID and the Ranging_Time message in the low-delay band, and the Ranging_Time message carries the equalization delay. Alternatively, after receiving the authentication request sent by the ONU, the ONU identifier and the equalization delay are sent to the ONU in the non-low-delay band. For example, if the system where the ONU is located is an NGPON2 PON system, and the ONU may operate in only one band and support the band switching, so the ONU may operate in the non-low-delay band first and report the first serial number in the non-low-delay band; the OLT sends the ONU identifier and the equalization delay to the ONU in the non-low-delay band, and the ONU sends the acknowledgement information to the OLT after receiving the ONU identifier and the equalization delay to complete authentication.

The present application provides an authentication method. If the optical line terminal operates in at least two bands, at least one low-delay band and at least one non-low-delay band are set. After the first serial number sent by an ONU or an auxiliary authentication device in a non-low-delay band is received, an equalization delay is acquired. After receiving the authentication request sent by the ONU or the auxiliary authentication device in the non-low-delay band, the ONU identifier is determined according to the first serial number or a second serial number of the ONU in the low-delay band sent by the ONU in the non-low-delay band. According to the ONU identifier and the equalization delay, the ONU is authenticated, and the newly-connected ONU can be authenticated.

On the basis of the preceding embodiment, variant embodiments of the preceding embodiment are proposed. It is to be noted that herein, for the brevity of description, only differences from the preceding embodiment will be described in the variant embodiments.

In an embodiment, the authentication of an ONU according to the ONU identifier and the equalization delay includes periodically sending, in the low-delay band, the ONU identifier and the equalization delay generated based on the SN, and receiving acknowledgement information sent by the ONU, where the acknowledgement information may be an acknowledgement (Ack) message.

After the ONU receives the ONU identifier and the equalization delay, the ONU sends the acknowledgement information to the OLT. After the OLT receives the acknowledgement information sent by the ONU, the authentication is completed. For example, the OLT periodically sends Assign_ONU_ID (the OLT assigns ONU-ID) and a Ranging_Time message in the low-delay band. After the OLT receives an Ack message returned by the newly-connected ONU, the OLT stops sending the message and starts the normal OMCI message interaction and service channel configuration flow.

If the system in which the ONU is located is a Combo PON system, the ONU may operate in only one band and does not support the band switching, the ONU requires to report the first serial number in another non-low-delay band by the auxiliary authentication device first. After the OLT receives the first serial number, the OLT sends a ranging request to the auxiliary authentication device or the ONU. The OLT performs ranging to acquire the equalization delay. After receiving the authentication request sent by the auxiliary authentication device in the non-low-delay band, the OLT periodically sends, in the low-delay band, the ONU identifier and the equalization delay generated based on the SN. After the ONU receives the ONU identifier and the equalization delay, the ONU sends acknowledgement information to the OLT. After receiving the acknowledgement information, the OLT completes the authentication.

In an embodiment, after receiving the serial number sent by the ONU in the non-low-delay band, acquiring the equalization delay includes after receiving the serial number sent by the ONU in the non-low-delay band, sending a ranging request to the ONU; and determining the equalization delay based on the time of the uplink optical signal sent by the ONU and the time the ranging request is sent to the ONU.

If the system in which the OLT and the ONU are located is an NGPON2 PON system, and the ONU may operate in only one band, the ONU may report the SN in the non-low-delay band first. If the system in which the OLT and the ONU are located is the 50G PON and 100G PON system, and the ONU may operate in multiple bands at the same time, the ONU may report the SN in a non-low-delay band first.

If the system in which the ONU is located is an NGPON2 PON system, and the ONU may operate in only one band and support the band switching, the newly-connected ONU may report the SN in the non-low-delay band first. After receiving the SN, the OLT sends a ranging request to the ONU. After receiving the ranging request, the ONU sends an uplink optical signal. The OLT calculates the equalization delay according to the time the uplink optical signal is received and the time the ranging request is sent to the ONU. If the system in which the ONU is located is a 50G PON and 100G PON system, in the 50G PON system, the OLT and the ONU support at most two bands at the same time, and in the 100G PON system, the OLT and the ONU support at most four bands at the same time. The newly-connected ONU may report the SN in a non-low-delay band first. After receiving the SN, the OLT sends a ranging request to the ONU. After receiving the ranging request, the ONU sends an uplink optical signal to the OLT. After the OLT receives the uplink optical signal, the OLT calculates the equalization delay according to the time the uplink optical signal is received and the time the ranging request is sent to the ONU.

In an embodiment, after receiving the serial number sent by the auxiliary authentication device in the non-low-delay band, acquiring the equalization delay includes after receiving the serial number sent by the auxiliary authentication device in the non-low-delay band, sending a ranging request to the auxiliary authentication device; and determining the equalization delay based on the time of the uplink optical signal sent by the auxiliary authentication device and the time the ranging request is sent to the auxiliary authentication device.

If the system in which the OLT and the ONU are located is a Combo PON system, since the ONU may operate in only one band and does not support the band switching, the serial number requires to be reported in another non-low-delay band by the auxiliary authentication device first.

If the system in which the ONU is located is a Combo PON system, and the ONU may operate in only one band and does not support the band switching, the first serial number requires to be reported by the auxiliary authentication device in another non-low-delay band. After receiving the first serial number, the OLT sends a ranging request to the auxiliary authentication device, and the OLT performs ranging to acquire the equalization delay.

In an embodiment, after receiving the acknowledgement information sent by the ONU, the method also includes sending a band switching instruction to the ONU after receiving a band switching request sent by the ONU so that the ONU switches to a low-delay band according to the band switching instruction.

If the system in which the OLT and the ONU are located is an NGPON2 PON system, and the ONU may operate in only one band, the ONU may report the SN in the non-low-delay band first. The OLT sends a ranging request to the ONU after receiving the SN. The ONU sends an uplink optical signal after receiving the ranging request. The OLT calculates the equalization delay according to the time the uplink optical signal is received and the time the ranging request is sent to the ONU. In the non-low-delay band, the EQD is sent to the ONU. The ONU sends acknowledgement information to the OLT. After the OLT receives the acknowledgement information sent by the ONU, the ONU sends a band switching request to the OLT. The OLT generates a band switching instruction after receiving the band switching request sent by the ONU, and sends the band switching instruction to the ONU. The ONU switches the operating band to a low-delay band according to the band switching instruction.

In an embodiment, the method also includes periodically sending a registration bandwidth if no ONU response is received within a preset time, and after receiving the uplink optical signal sent by the ONU, determining whether a difference value between the receiving time of the uplink optical signal and the expected time is greater than a first threshold; and if the uplink optical signal is greater than the first threshold, the equalization delay is adjusted.

If no ONU response is received within a preset time, it represents that the authenticated ONU goes offline due to power failure or other reasons, and the OLT periodically sends a registration bandwidth. After receiving the registration bandwidth, the ONU sends an upstream optical signal to the OLT. After receiving the upstream optical signal, the OLT determines whether the upstream optical signal is drifted. If the upstream optical signal is drifted, the OLT adjusts the equalization delay. If the upstream optical signal is not drifted, the OLT notifies the ONU to go online directly through a private PLOAM message or an OMCI message to recover a normal service and update configuration information. For example, after the authenticated ONU goes offline due to power failure or other reasons, ONU_ID and the equalization delay remain unchanged. The OLT periodically sends the registration bandwidth, and the registration bandwidth is similar to the OMCI bandwidth, where Alloc-Id=ONU_ID, StartTime=S, and GrantSize=1. The ONU receives the Burst_Profile message and enters O2-3 state. After receiving the registration bandwidth in O2-3 state, the ONU sends an upstream optical signal in a time delay of ResponseTime+EQD+StartTime for responding to the registration bandwidth. The OLT checks whether the upstream optical signal is drifted after receiving the upstream optical signal sent by the ONU. If the upstream optical signal is drifted, the OLT sends a Ranging_Time message to fine-tune the EQD. The ONU requires to write the fine-tuned EQD into the chip and the power-down storage medium. If the upstream optical signal is not drifted, that is, the upstream optical signal is normal, the ONU is notified to go online directly through a private PLOAM message or an OMCI message to recover the normal service and update configuration information.

In an embodiment, if no ONU response is received within the preset time, periodically sending a registration bandwidth includes one of sending the registration bandwidth in a first period if no ONU response is received within a first preset time; or sending the registration bandwidth in a second period if no ONU response is received within a second preset time, where the second preset time is greater than the first preset time, and the second period is greater than the first period.

In an initial offline stage of the ONU, the period of the OLT sending the registration bandwidth may be shortened appropriately. For example, the registration bandwidth may be sent every second. When the ONU does not respond to the bandwidth for a long time, the period of the OLT sending the registration bandwidth may be extended appropriately. For example, the registration bandwidth may be sent every minute to minimize occupation of the bandwidth. When the OLT detects that the uplink optical signal sent by the ONU is abnormal, the OLT may start a long light emission detection flow and send and broadcast a Disable_Serial_Number message. The OLT disables all ONUs in the low-delay line, and then enables the ONUs one by one to check which ONU has an abnormal optical signal. Finally, the abnormal ONU is disabled again, and the normal ONUs are enabled again.

In an embodiment, after receiving the acknowledgement information sent by the ONU, the method also includes predeploying a protection PON port, and if no uplink optical signal is received within a preset time, switching a low-latency service to the protection PON port; alternatively, predeploying a protection band, sending an identifier corresponding to the protection band to the ONU, and if no uplink optical signal is received within a preset time, switching a low-latency service to the protection band.

When the low-delay line is interrupted due to a PON port failure or other reasons, the low-delay line may be switched to a standby line by Type B switching or band switching. If the system in which the ONU and the OLT are located is a Combo PON system, the OLT may preset a protection PON port when the low-delay line is deployed. When the OLT does not receive an uplink optical signal within the preset time, all low-latency services are switched to the protection PON port. For example, for the Combo PON system, the OLT may set a protection PON port in advance when the low-delay line is deployed. When the OLT does not receive the uplink optical signal within the preset time, all low-latency services are switched to the protection PON port. When the ONU does not receive a downlink optical signal, the ONU enters O6 state. If the ONU receives the downlink optical signal within TO2 time, the ONU directly switches back to O5 state, stops TO2 time, and recovers a normal service. If the ONU does not receive the downlink optical signal within TO2 time, the ONU enters O2-3 state, and goes online quickly through the registration bandwidth. During the whole switching process, the ONU keeps ONU_ID and the EQD unchanged, the OLT does not perform the ranging, and the OLT may adjust the EQD of the ONU through a Ranging_Time message.

For the NGPON2, 50G PON, and 100G PON systems, the OLT may preset a protection band in advance when the low-delay line is deployed, and notify the ONU through a private message. All low-latency services are switched to the protection band when the OLT does not receive an uplink optical signal within a preset time. For example, for the NGPON2, 50G PON, and 100G PON systems, the OLT may preset a protection band when the low-delay line is deployed, and the OLT notify the ONU through the private PLOAM message or the OMCI message. When the OLT does not receive the uplink optical signal within the preset time, the OLT switches all low-latency services to the protection band. When the ONU does not detect a downlink optical signal within the preset time, the ONU switches to the protection band, and enters O6 state at the same time. If the ONU receives the downlink optical signal within TO2 time, the ONU directly switches back to O5 state. If no downlink optical signal is detected within TO2 time, the ONU enters O2-3 state, and goes online quickly through the registration bandwidth. During the whole switching process, the ONU keeps ONU_ID and the EQD unchanged, and the OLT does not perform the ranging, and the OLT may adjust the EQD of the ONU through a Ranging_Time message.

It is to be noted that system modes of different PON accessing technologies are different. For example, in a Combo PON system, the optical line terminal supports two bands of 1310 nm for uplink/1490 nm for downlink and 1270 nm for uplink/1577 nm for downlink. The ONU may only operate in one of the two bands and does not support the band switching. In an NGPON2 PON system, the OLT and the ONU support at most eight bands among 1532.68-1538.19 nm band for uplink and 1596.34-1602.31 nm band for downlink, and the ONU may operate in only one of them. The OLT may notify, through a Tuning_Control message, the ONU to perform the band switching. The 50G PON and 100G PON system are generally implemented by n*25G, where n represents the number of bands, that is, in the 50G PON system, the OLT and the ONU support at most two bands at the same time, and in the 100G PON system, the OLT and the ONU support at most four bands at the same time.

For a low-delay line, the OLT does not periodically send the SN request and ranging request, that is, the SN window opening and the ranging window opening are not performed to reduce the communication delay.

In an example, preliminary authentication needs to be performed on a newly-connected ONU before the newly-connected ONU accesses the low-delay line. For a Combo PON system, the ONU may operate in only one band and does not support the band switching, and the SN requires to be reported and ranging requires to be performed in another non-low-delay band through an auxiliary authentication device first. The auxiliary authentication device and the newly-connected ONU have the same registration information. The OLT may be notified through a private PLOAM message or an OMCI message that the newly-connected ONU requires to be authenticated in the low-delay band. After the OLT receives the SN and the equalization delay, the OLT periodically sends Assign_ONU_ID and the Ranging_Time message in the low-delay band. After the OLT receives the Ack message returned by the newly-connected ONU, the OLT stops sending the message and starts the normal OMCI message interaction and service channel configuration flow. The newly-connected ONU requires to write ONU_ID and the equalization delay into the power-down storage medium so that ONU_ID and the EQD can be acquired from the power-down storage medium without relying on the auxiliary authentication device after a restart, thereby realizing quick go-online and service recovery. For an NGPON2 system, the ONU operates in only one band but can perform the band switching. The newly-connected ONU may perform the SN reporting and the ranging in the non-low-delay band, and then goes online through a private PLOAM message or an OMCI message to notify the OLT that low-delay band switching is required. The OLT notifies, through a Tuning_Control message, the ONU to perform the band switching. After entering a low-delay band, the ONU requires to write the ONU_ID, the EQD, and band information into the power-down storage medium, thereby realizing quick go-online and service recovery after a restart. For the 50G PON and 100G PON system, the ONU may operate in multiple bands at the same time. The newly-connected ONU may perform the SN reporting and the ranging in the non-low-delay band, and may notify the OLT of the required serial number of the ONU in the low-delay band through a private PLOAM message or an OMCI message after going online. After acquiring the SN and the equalization delay, the OLT periodically sends Assign_ONU_ID and the Ranging_Time message in the low-delay band. When the OLT receives the Ack message returned by the newly-connected ONU, the OLT stops sending the message, and starts the normal OMCI message interaction and service channel configuration flow. The ONU writes ONU_ID, the EQD, and band information into the power-down storage medium, thereby realizing quick go-online and service recovery after a restart.

After the authenticated ONU goes offline due to power failure or other reasons, ONU_ID and the equalization delay remain unchanged. The OLT periodically sends the registration bandwidth. The registration bandwidth is similar to the OMCI bandwidth, Alloc-Id=ONU_ID, StartTime=S, and GrantSize=1. The ONU receives a Burst Profile message and enters O2-3 state. When the ONU receives the registration bandwidth in O2-3 state, the ONU delays a ResponseTime+ Eqd+StartTime, and then sends an uplink optical signal. In response to the registration bandwidth, after receiving the uplink optical signal sent by the ONU, the OLT checks whether the uplink optical signal is drifted. If the uplink optical signal is drifted, the OLT sends a Ranging_Time message to fine-tune the EQD. The ONU requires to write the fine-tuned EQD into the chip and the power-down storage medium. If the uplink optical signal is normal, the ONU is notified to directly go online through a private PLOAM message or an OMCI message to recover the normal service and update configuration information. In the initial offline stage of the ONU, the period of the OLT sending the registration bandwidth may be shortened appropriately. For example, the registration bandwidth may be sent every second. When the ONU does not respond to the bandwidth for a long time, the period of the OLT sending the registration bandwidth may be extended appropriately. For example, the registration bandwidth may be sent every minute to minimize occupation of the bandwidth. When the OLT detects an abnormal optical signal, the OLT may enable the long light emission detection flow and send and broadcast a Disable_Serial_Number message. The OLT enables all ONUs in the low-delay line, and then enables the ONUs one by one to check which ONU has an abnormal optical signal. Finally, the abnormal ONU is disabled, and the normal ONU is enabled again.

The low-delay line may be switched to a standby line by Type B switching or band switching when the service is interrupted due to the PON port failure or other reasons. For a Combo PON system, the OLT may preset a protection PON port when the low-delay line is deployed. When the OLT cannot detect an uplink optical signal, all low-latency services are switched to the protection PON port. When the ONU cannot detect a downlink optical signal, the ONU enters O6 state. If the downlink optical signal is detected within TO2 time, the ONU directly switches back to O5 state, stops TO2 time, and recovers the normal service. If the downlink optical signal cannot be detected within TO2 time, the ONU enters O2-3 state, and goes online quickly through the registration bandwidth. During the whole switching process, the ONU keeps ONU_ID and the EQD unchanged, the OLT does not perform the ranging, and the OLT may adjust the EQD of the ONU through a Ranging_Time message. For the NGPON2, 50G PON, and 100G PON systems, the OLT may preset a protection band when the low-delay line is deployed, and notify the ONU through a private PLOAM message or an OMCI message. When the OLT cannot detect an uplink optical signal, all low-latency services are switched to the protection band. When the ONU cannot detect a downlink optical signal, the ONU switches to the protection band and enters O6 state at the same time. If the ONU detects the downlink optical signal within TO2 time, the ONU directly switches back to O5 state. If the ONU cannot receive a downlink optical signal within TO2 time, the ONU enters O2-3 state, and goes online quickly through the registration bandwidth. During the whole switching process, the ONU keeps ONU_ID and the EQD unchanged, and the OLT does not perform ranging, and the OLT may adjust the EQD of the ONU through the Ranging_Time message.

In the present application, the preliminary authentication of the low-delay line for the newly-connected ONU is realized through the auxiliary authentication device or the multi-band, and for the authenticated ONU, the OLT periodically sends the registration bandwidth to realize quick go-online and service recovery of the ONU to reduce the network communication delay of the operator and improve the user experience.

Figure 2:
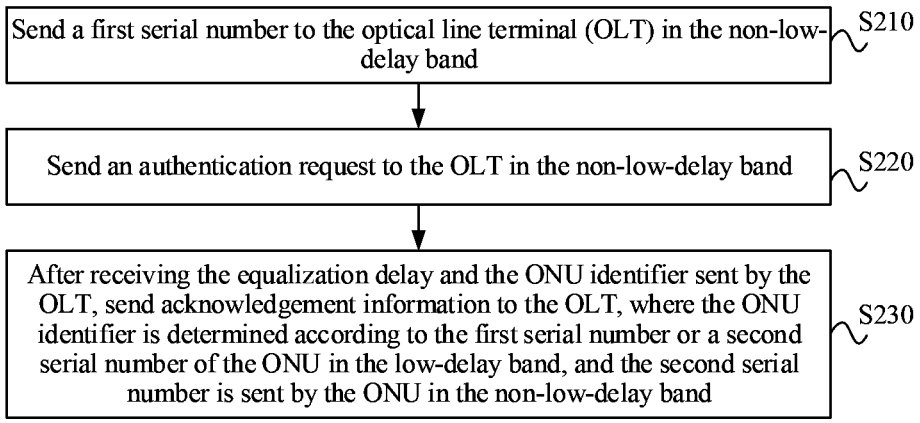
FIG. 2 is a flowchart of an authentication method according to another embodiment of the present application.

In an example embodiment, FIG. 2 is a flowchart of an authentication method provided by the present application. The method may be applicable to a scenario where an optical line terminal authenticates a newly-connected ONU. The method may be performed by an authentication apparatus. The authentication apparatus may be implemented in software and/or hardware and integrated into a device. The device may be a computer device.

As shown in FIG. 2, the authentication method provided by the present application includes S210, S220, and S230.

In S210, a first serial number is sent to the optical line terminal in the non-low-delay band.

If the system in which the OLT and the ONU are located is an NGPON2 PON system, the OLT and the ONU support at most eight bands among 1532.68-1538.19 nm for uplink/ 1596.34-1602.31 nm for downlink, and the ONU may only operate only in one band of the eight bands, the ONU may send the first serial number to the OLT in the non-low-delay band first. If the system in which the OLT and the ONU are located is a 50G PON and 100G PON system, generally implemented by n*25G, where n represents the number of bands, that is, in the 50G PON system, the OLT and the ONU support at most two bands at the same time, and in the 100G PON system, the OLT and the ONU support at most four bands at the same time. The ONU may send the first serial number to the OLT in the non-low-delay band first. After the ONU goes online, the ONU notifies the OLT of a second serial number in the low-delay band through a private PLOAM message or an OMCI message.

In S220, an authentication request is sent to the OLT in the non-low-delay band.

The ONU identifier is ONU_ID, and the ONU identifier is determined according to the first serial number or the second serial number.

The authentication request may be sent to the OLT in such a manner that the ONU notifies the OLT through a private PLOAM message or an OMCI message that a newly-connected ONU needs to be authenticated in the low-delay band.

An authentication request is sent to the optical line terminal so that the OLT periodically sends the ONU identifier and the equalization delay in the low-delay band. For example, the ONU notifies the OLT through a private PLOAM message or an OMCI message that the newly-connected ONU requires to be authenticated in the low-delay band. After acquiring the equalization delay and the serial number, the OLT periodically sends Assign_ONU_ID and the Ranging_Time message in the low-delay band, and the Ranging_Time message carries the equalization delay.

In S230, after the equalization delay and the ONU identifier sent by the OLT are acquired, acknowledgement information is sent to the OLT. The ONU identifier is determined according to the first serial number or the second serial number of the ONU in the low-delay band, and the second serial number is sent by the ONU in the non-low-delay band.

The acknowledgement information may be an Ack message.

After receiving the ONU identifier and the equalization delay, the ONU sends the acknowledgement information to the OLT. After the OLT receives the acknowledgement information sent by the ONU, the authentication is completed. For example, the OLT periodically sends Assign_ONU_ID (the OLT assigns ONU-ID) and a Ranging_Time message in the low-delay band. After the OLT receives the Ack message returned by the newly-connected ONU, the OLT stops sending the message and starts the normal OMCI message interaction and service channel configuration flow.

The present application provides an authentication method. The method includes sending a first serial number to an optical line terminal in a non-low-delay band; sending an authentication request to the OLT in the non-low-delay band; after receiving the equalization delay and the ONU identifier sent by the OLT, sending acknowledgement information to the OLT. The ONU identifier is determined according to the first serial number or the second serial number of the ONU in the low-delay band sent by the ONU in the non-low-delay band. The ONU identifier can authenticate the newly-connected ONU, thereby reducing the delay.

On the basis of the preceding embodiment, variant embodiments of the preceding embodiment are proposed. It is to be noted that herein, for the brevity of description, only differences from the preceding embodiment will be described in the variant embodiments.

In an embodiment, after sending acknowledgement information to the OLT, the method also includes sending a band switching request to the OLT through a private message, alternatively, the method also includes sending a second serial number of the ONU in the non-low-delay band to the OLT through a private message.

Based on different systems where the OLT and the ONU are located, the ONU performs different operations after being authenticated successfully. For example, if the system in which the OLT and the ONU are located is an NGPON2 PON system, and the ONU may operate in only one band, the ONU may report the first serial number in a non-low-delay band first. After receiving the first serial number, the OLT sends a ranging request to the ONU. The ONU sends an uplink optical signal after receiving the ranging request. The OLT calculates the equalization delay according to the time the uplink optical signal is received and the time the ranging request is sent to the ONU. After receiving the authentication request sent by the ONU, the OLT sends an ONU identifier and the equalization delay to the ONU in the non-low-delay band. The ONU sends acknowledgement information to the OLT after receiving the ONU identifier and the equalization delay. The ONU sends a band switching request to the OLT after the OLT receives the acknowledgement information sent by the ONU. The OLT generates a band switching instruction after receiving the band switching request sent by the ONU, and sends the band switching instruction to the ONU. The ONU switches the operating band to the low-delay band according to the band switching instruction. If the system in which the OLT and the ONU are located is a 50G PON and 100G PON system, and the ONU may work in multiple bands at the same time, the ONU may report the first serial number in the non-low-delay band first. After the OLT receives the first serial number, the OLT sends a ranging request to the ONU. The ONU sends an uplink optical signal after receiving the ranging request. The OLT calculates the equalization delay according to the time the uplink optical signal is received and the time the ranging request is sent to the ONU. After the ONU goes online, the ONU sends a second serial number to the OLT in the non-low-delay band. The OLT periodically sends the ONU identifier and the equalization delay in the low-delay band after receiving the authentication request sent by the ONU. After receiving the ONU identifier and the equalization delay, the ONU sends acknowledgement information to the OLT. The OLT stops sending the message, and starts to perform the normal OMCI message interaction and service channel configuration flow after receiving the acknowledgement information.

In an embodiment, the method also includes writing the ONU identifier and equalization delay into the power-down storage medium.

After the authentication is completed, the newly-connected ONU requires to write the ONU_ID and the EQD into the power-down storage medium so that quick go-online and service recovery can be realized after a restart. For example, for a Combo PON system, after the authentication is completed, the newly-connected ONU requires to write ONU_ID and the equalization delay into the power-down storage medium so that ONU_ID and the EQD can be acquired from the power-down storage medium without relying on the auxiliary authentication device after a restart, thereby realizing the quick go-online and service recovery. For an NGPON2 system, after the band switching is performed, the ONU requires to write ONU_ID, the EQD, and the band information into the power-down storage medium after entering the low-delay band, thereby realizing the quick go-online and service recovery after a restart. For the 50G PON and 100G PON system, the ONU requires to write the ONU_ID of the low-delay band and the equalization delay into the power-down storage medium after the ONU is successfully authenticated, thereby realizing the quick go-online and service recovery after a restart. After the authenticated ONU goes offline due to power failure or other reasons, if the EQD requires to be fine-tuned, the ONU requires to write the fine-tuned EQD into the chip and the power-down storage medium.

In an embodiment, the method further includes that an uplink optical signal is sent to the OLT after receiving a registration bandwidth.

If the authenticated ONU goes offline due to power failure or other reasons, the OLT periodically sends the registration bandwidth. After receiving the registration bandwidth, the ONU sends an uplink optical signal to the OLT for responding to the registration bandwidth. For example, after the authenticated ONU goes offline due to power failure or other reasons, ONU_ID and the equalization delay remain unchanged. The OLT periodically sends the registration bandwidth. The registration bandwidth is similar to the OMCI bandwidth, where Alloc-Id=ONU_ID, StartTime=S, and GrantSize=1. The ONU receives a Burst Profile message and enters O2-3 state. After receiving the registration bandwidth in O2-3 state, the ONU delays a ResponseTime+EQD+StartTime and then sends an uplink optical signal for responding to the bandwidth.

In an embodiment, the method also includes switching the low-latency service to a protection band if no downlink optical signal is received within a preset time.

If the ONU does not receive the downlink optical signal within the preset time, it represents that the low-delay line is interrupted due to a PON port failure or other reasons.

If no downlink optical signal is received within the preset time, the low-latency service is switched to a protection band. For example, for the NGPON2, 50G PON, and 100G PON systems, the OLT may preset the protection band when the low-delay line is deployed, and notify the ONU through a private PLOAM message or an OMCI message. When the ONU cannot detect the downlink optical signal, the ONU switches to the protection band, and enters O6 state at the same time. If the downlink optical signal is detected within TO2 time, the ONU directly switches back to O5 state. If the downlink optical signal cannot be detected within TO2 time, the ONU enters O2-3 state and goes online quickly through the registration bandwidth. During the whole switching process, the ONU keeps ONU_ID and the EQD unchanged, and the OLT does not perform the ranging. The OLT may adjust the EQD of the ONUs through the Ranging_Time message.

Figure 2A:
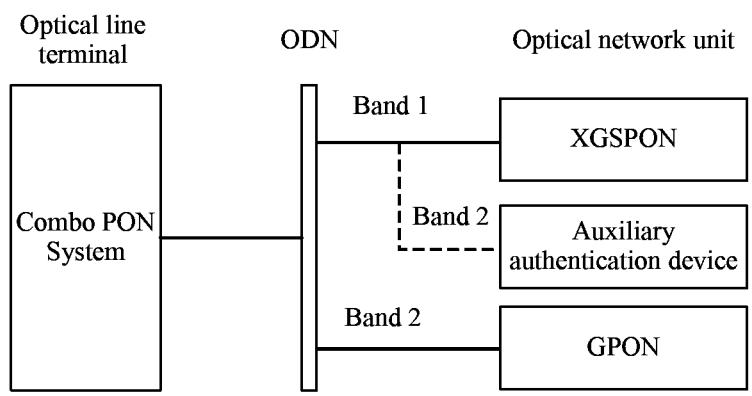
FIG. 2A is a diagram of a low-delay Combo PON system according to another embodiment of the present application.

In an example, as shown in FIG. 2A, a gigabit-capable passive optical network (GPON) ONU and a 10G symmetric GPON (XGSPON) ONU are under a Combo PON OLT. The GPON ONU and the XGSPON ONU are under the Combo PON OLT through an optical distribution network (ODN). The XGSPON ONU is a low-delay ONU, and band 1 in which the XGSPON ONU is located is a low-delay band. Band 2 in which the GPON ONU is located is a non-low-delay band. The XGSPON ONU requires to perform the SN reporting and the ranging in the non-low-delay band through the auxiliary authentication device when the XGSPON ONU goes online for the first time. The XGSPON ONU writes ONU_ID and the EQD into the power-down storage medium after going online in the low-delay band so that the XGSPON ONU goes online for the next time without relying on an auxiliary authentication device, thereby realizing the quick go-online through the registration bandwidth.

Figure 2B:
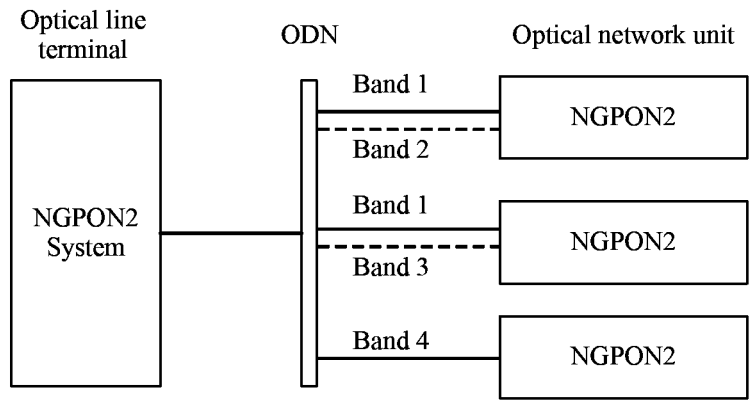
FIG. 2B is a diagram of a low-delay 40-Gigabit-capable passive optical network 2 (NGPON2) system according to another embodiment of the present application.

As shown in FIG. 2B, three NGPON2 ONUs are under an NGPON2 OLT through an ODN. Two of the three NGPON2 ONUs are low-delay ONUs. Band 1 is a low-delay band, and bands 2, 3, and 4 are non-low-delay bands. The low-delay ONU may perform the SN reporting and the ranging in the low-delay band, and after going online, the ONU switches to the low-delay band through a Tuning_Control message sent by the OLT. After the ONU enters the low-delay band, the ONU requires to write ONU_ID, the EQD, and the band information into the power-down storage medium. When the ONU goes online for the next time, the quick go-online can be implemented through the registration bandwidth.

Figure 2C:
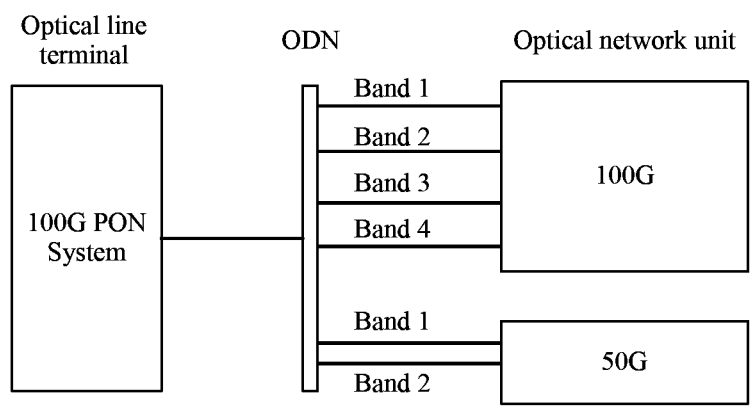
FIG. 2C is a diagram of a low-delay 50G PON and 100G PON system according to another embodiment of the present application.

As shown in FIG. 2C, a 50G ONU and a 100G ONU are under a 100G PON OLT through an ODN. Band 1 is a low-delay band. Bands 2, 3, and 4 are non-low-delay bands. The low-delay ONU may perform the SN reporting and the ranging in the non-low-delay band. The OLT acquires the registration information and then authenticates the low-delay ONU in band 1. After the ONU goes online, the ONU writes ONU_ID and the EQD into the power-down storage medium. When the ONU goes online for the next time, the quick go-online can be implemented through the registration bandwidth.

Figure 2D:
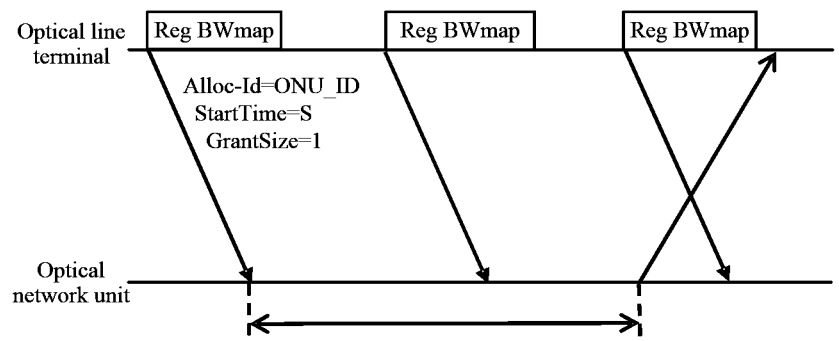
FIG. 2D is a diagram illustrating how to implement a registration bandwidth according to another embodiment of the present application.

As shown in FIG. 2D, after an authenticated ONU goes offline, the OLT periodically sends the registration bandwidth, where Alloc-Id=ONU_ID, StartTime=S, and GrantSize=1. If the ONU does not respond to the registration bandwidth for a long time, the period of the OLT sending the registration bandwidth may be extended appropriately. After acquiring the registration bandwidth, the ONU delays a time of ResponseTime+EQD+StartTime, and then sends an uplink optical signal. The OLT determines whether to adjust the EQD of the ONU through the Ranging_Time message according to the drifting condition of the ONU optical signal. If the optical signal of an ONU is normal, the OLT may notify the ONU to directly go online through a private PLOAM message or an OMCI message.

Figure 2E:
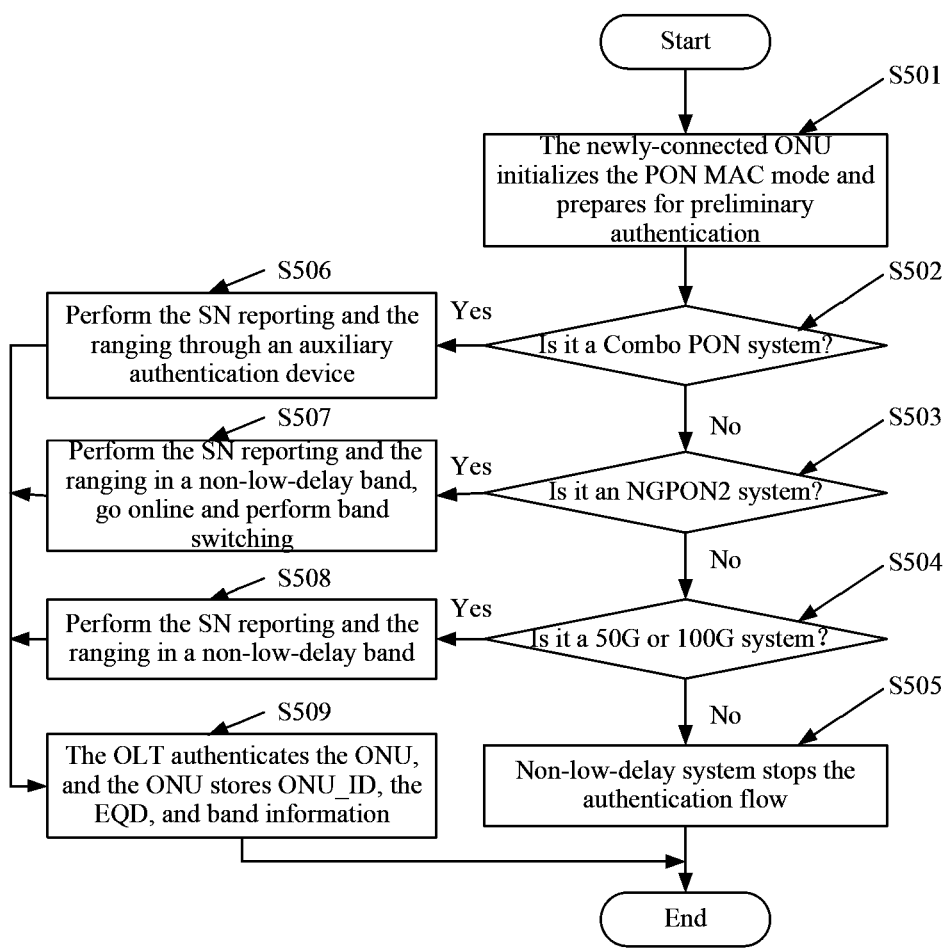
FIG. 2E is a flowchart of a preliminary authentication method for a newly-connected low-delay ONU according to another embodiment of the present application.

As shown in FIG. 2E, the process includes S501, S502, S503, S504, S505, S506, S507, and S508. In S501, a newly-connected ONU initializes the PON MAC mode and prepares for preliminary authentication. In S502, it is determined whether the system is a Combo PON system, if so, the process goes to S506, and if not, the process goes to S503. In S503, it is determined whether the system is an NGPON2 system, if so, the process goes to S507, and if not, the process goes to S504. In S504, it is determined whether the system is a 50G PON system or a 100G PON system, if so, the process goes to S508, and if not, the process goes to S505. In S505, the non-low-delay system stops the authentication flow. In S506, the ONU performs the SN reporting and the ranging through the auxiliary authentication device. In S507, the ONU performs the SN reporting and the ranging through the non-low-delay band. After the ONU goes online, the ONU may notify the OLT of low-delay band switching through a private PLOAM message or an OMCI message. The OLT sends a Tuning_Control message to notify the ONU to perform the low-delay band switching. In S508, after receiving the registration information, the OLT performs the preliminary authentication on the ONU. The ONU writes ONU_ID and the EQD into the power-down storage medium. For the NGPON2, 50G PON, and 100G PON systems, it is also necessary to write the band information into the power-down storage medium.

Figure 2F:
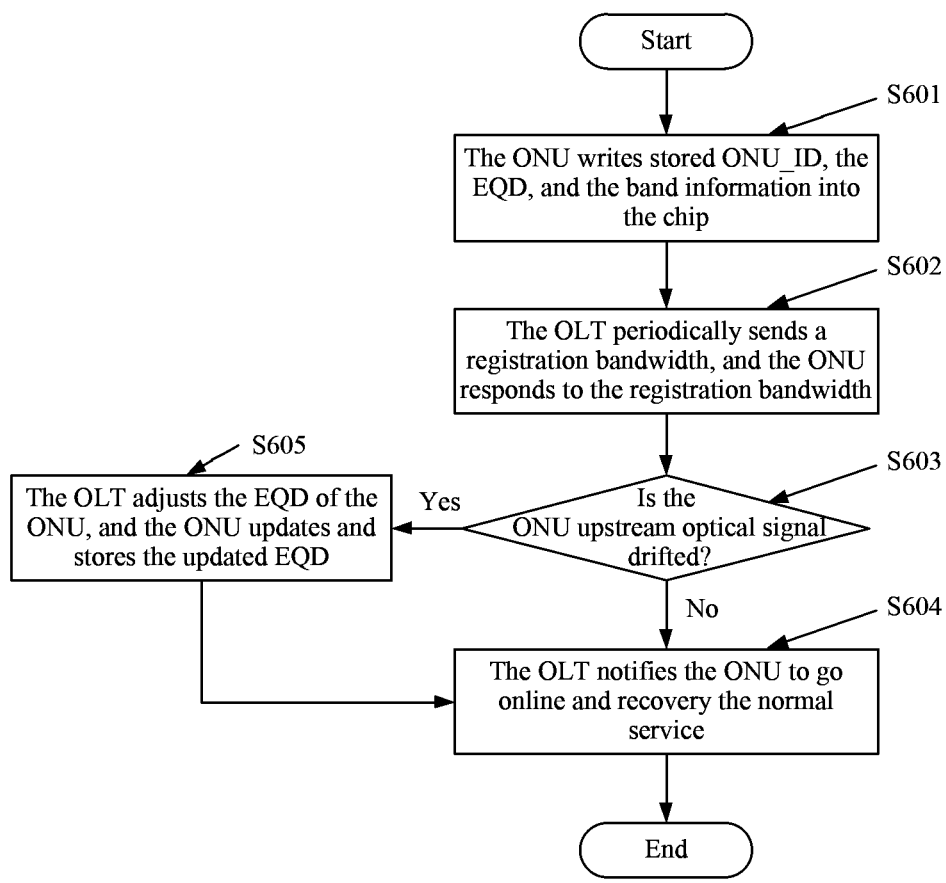
FIG. 2F is a flowchart of a quick go-online method for an authenticated low-delay ONU according to an embodiment of the present application.

As shown in FIG. 2F, the process includes S601, S602, S603, S604, and S605. In S601, the ONU writes stored ONU_ID, the EQD, and the band information into the chip. In S602, the OLT periodically sends the registration bandwidth, and the ONU responds to the registration bandwidth after receiving the registration bandwidth. In S603, the OLT determines whether the uplink optical signal of the ONU is drifted. If so, the process goes to S605 instead of S604. In S604, the OLT notifies the ONU to go online and recover the normal service through a private PLOAM message or an OMCI message. In S605, the OLT adjusts the EQD of the ONU through a Ranging_Time message, and the ONU updates the EQD and writes the updated EQD into the power-down storage medium.

Figure 2G:
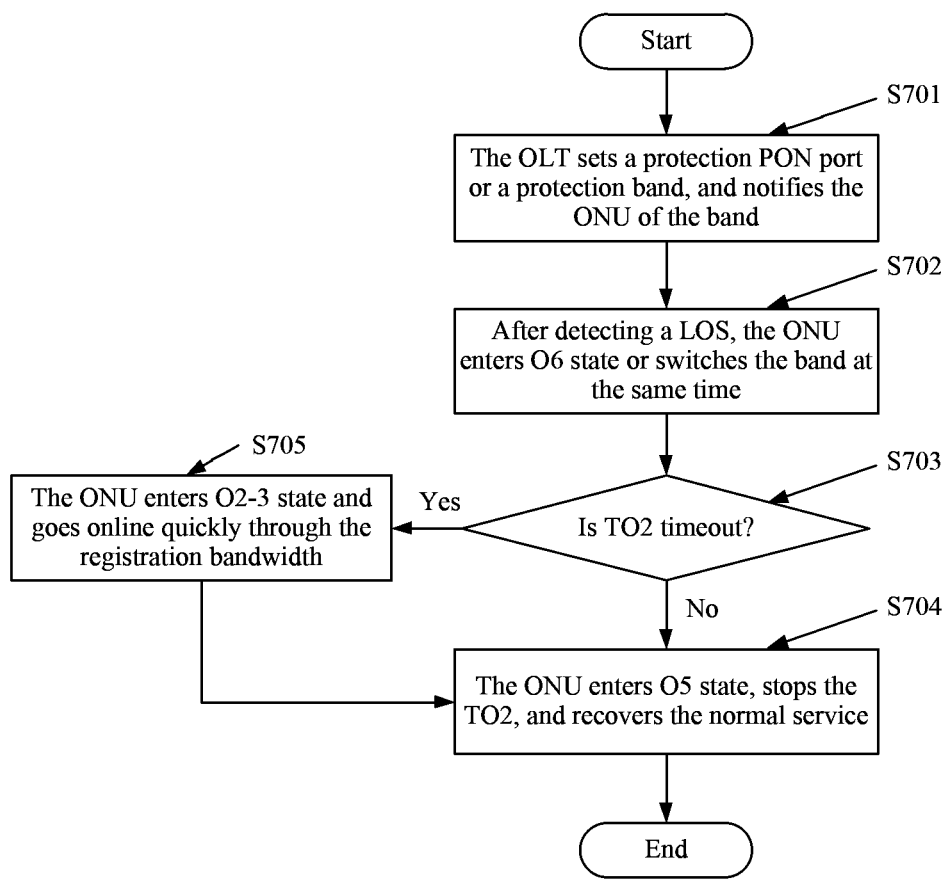
FIG. 2G is a flowchart of a protection method for a low-delay line according to an embodiment of the present application.

As shown in FIG. 2G, the process includes S701, S702, S703, S704, and S705. In S701, the OLT sets a protection PON port or a protection band, and notifies the ONU of the protection band through a private PLOAM message or an OMCI message. In S702, the ONU enters O6 state after detecting a LOS. For the NGPON2, 50G PON and 100G PON systems, the band requires to be switched at the same time. In S703, it is determined whether the downlink optical signal is detected within TO2 time. If so, the process goes to S705 instead of S704. In S704, the ONU enters O5 state, stops TO2 time, and recovers the normal service. In S705, the ONU enters 02-3 state and goes online quickly through the registration bandwidth.

Figure 3:
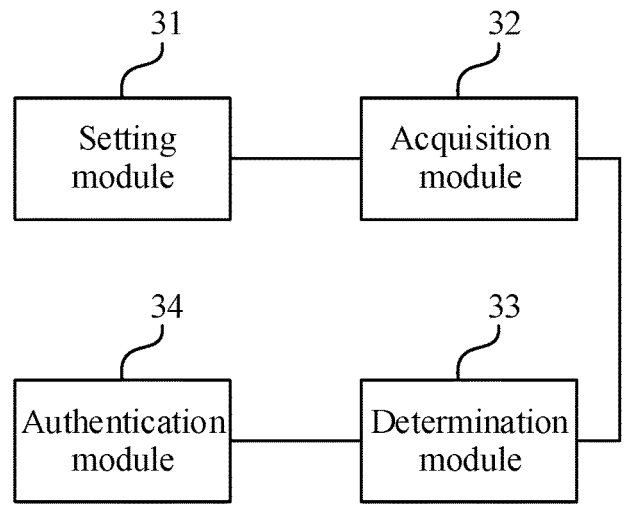
FIG. 3 is a diagram illustrating the structure of an authentication apparatus according to an embodiment of the present application.

The present application provides an authentication apparatus. FIG. 3 is a diagram of an authentication apparatus provided by the present application. The apparatus is configured on a computer device. Referring to FIG. 3, the apparatus includes a setting module 31 configured to set at least one low-delay band and at least one non-low-delay band if the optical line terminal operates in at least two bands, an acquisition module 32 configured to acquire the equalization delay after the first serial number sent by an ONU or the auxiliary authentication device in a non-low-delay band is received; a determination module 33 configured to determine the ONU identifier according to the first serial number or the second serial number of the ONU in the low-delay band sent by the ONU in the non-low-delay band after the authentication request sent by the ONU or the auxiliary authentication device in the non-low-delay band is received; and an authentication module 34 configured to authenticate the ONU according to the ONU identifier and the equalization delay.

The authentication apparatus provided by the embodiment of the present application is configured to implement the authentication method of the present application. The working principle and the technical effect of the authentication device provided by the embodiment of the present application are similar to that of the authentication method according to the embodiments of the present application. The details are not repeated here.

On the basis of the preceding embodiment, variant embodiments of the preceding embodiment are proposed. It is to be noted that herein, for the brevity of description, only differences from the preceding embodiment will be described in the variant embodiments.

In an embodiment, the acquisition module 32 is configured to send a ranging request to the ONU after receiving the serial number sent by the ONU in the non-low-delay band, and determine the equalization delay based on the time of the uplink optical signal sent by the ONU and the time the ranging request is sent to the ONU.

In an embodiment, the acquisition module 32 is configured to send a ranging request to the auxiliary authentication device after receiving the serial number sent by the auxiliary authentication device in the non-low-delay band, and determine the equalization delay based on the time of the uplink optical signal sent by the auxiliary authentication device and the time the ranging request is sent to the auxiliary authentication device.

In an embodiment, the authentication module 34 is configured to periodically send, in the low-delay band, the ONU identifier and the equalization delay generated based on the SN, and receive acknowledgement information sent by the ONU.

In an embodiment, the authentication module 34 is configured to send the ONU identifier and the equalization delay to the ONU in the non-low-delay band, and receive the acknowledgement information sent by the ONU.

In an embodiment, the acquisition module 31 is configured to send a band switching instruction to the ONU after receiving the band switching request sent by the ONU so that the ONU switches to the low-delay band according to the band switching instruction.

In an embodiment, the acquisition module 31 is configured to receive the serial number sent by the ONU in the low-delay band.

In an embodiment, the apparatus also includes a bandwidth sending module configured to periodically send a registration bandwidth if no ONU response is received within a preset time, a determination module configured to determine whether a difference value between the receiving time of the uplink optical signal and the expected time is greater than a first threshold after receiving the uplink optical signal sent by the ONU, and an adjustment module configured to adjust the equalization delay if the difference value between the receiving time of the uplink optical signal and the expected time is greater than the first threshold.

In an embodiment, the apparatus also includes a first deployment module configured to predeploy a protection PON port. If no uplink optical signal is received within a preset time, the low-latency service is switched to the protection PON port. Alternatively, the apparatus may also include a second deployment module configured to predeploy the protection band and send the identifier corresponding to the protection band to the ONU. If no uplink optical signal is received within a preset time, the low-latency service is switched to the protection band.

In an embodiment, the bandwidth sending module is configured to send a registration bandwidth in the first period if no ONU response is received within a first preset time. If no ONU response is received within a second preset time, the bandwidth sending module sends a registration bandwidth in a second period, where the second preset time is greater than the first preset time, and the second period is greater than the first period.

Figure 4:
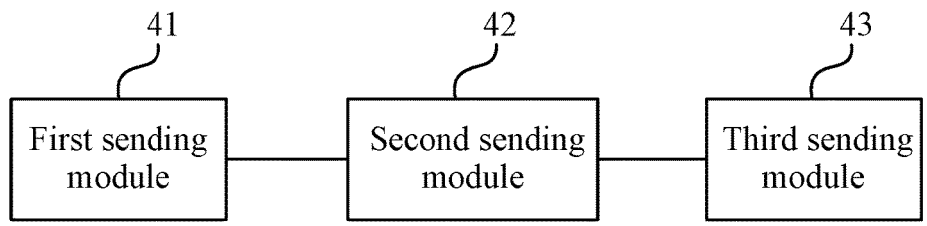
FIG. 4 is a diagram of an authentication apparatus according to another embodiment of the present application.

The present application provides an authentication apparatus. FIG. 4 is a diagram of an authentication apparatus provided by the present application. The apparatus is configured on a computer device. Referring to FIG. 4, the apparatus includes a first sending module 41 configured to send a first serial number to an optical line terminal in a non-low-delay band, a second sending module 42 configured to send an authentication request to the OLT in a non-low-delay band, and a third sending module 43 configured to send acknowledgement information to the OLT after receiving the equalization delay and the ONU identifier sent by the OLT, where the ONU identifier is determined according to the first serial number or the second serial number of the ONU in the low-delay band, and the second serial number is sent by the ONU in the non-low-delay band.

The authentication apparatus according to the embodiment of the present application is configured to implement the authentication method of the present application. The working principle and the technical effect of the authentication apparatus according to the embodiment of the present application are similar to that of the authentication method according to the embodiments of the present application. The details are not repeated here.

On the basis of the preceding embodiment, variant embodiments of the preceding embodiment are proposed. It is to be noted that herein, for the brevity of description, only differences from the preceding embodiment will be described in the variant embodiments.

In an embodiment, the apparatus also includes a switching module configured to send a band switching request to the OLT through a private message. Alternatively, the apparatus also includes a fourth sending module configured to send the second serial number of the ONU in the low-delay band to the OLT through a private message.

In an embodiment, the apparatus also includes a writing module configured to write the ONU identifier and equalization delay into the power-down storage medium.

In an embodiment, the apparatus also includes a fifth sending module configured to send an uplink optical signal to the OLT after receiving the registration bandwidth.

In an embodiment, the method also includes a switching module configured to switch a low-latency service to the protection band if no downlink optical signal is received within a preset time.

Figure 5:
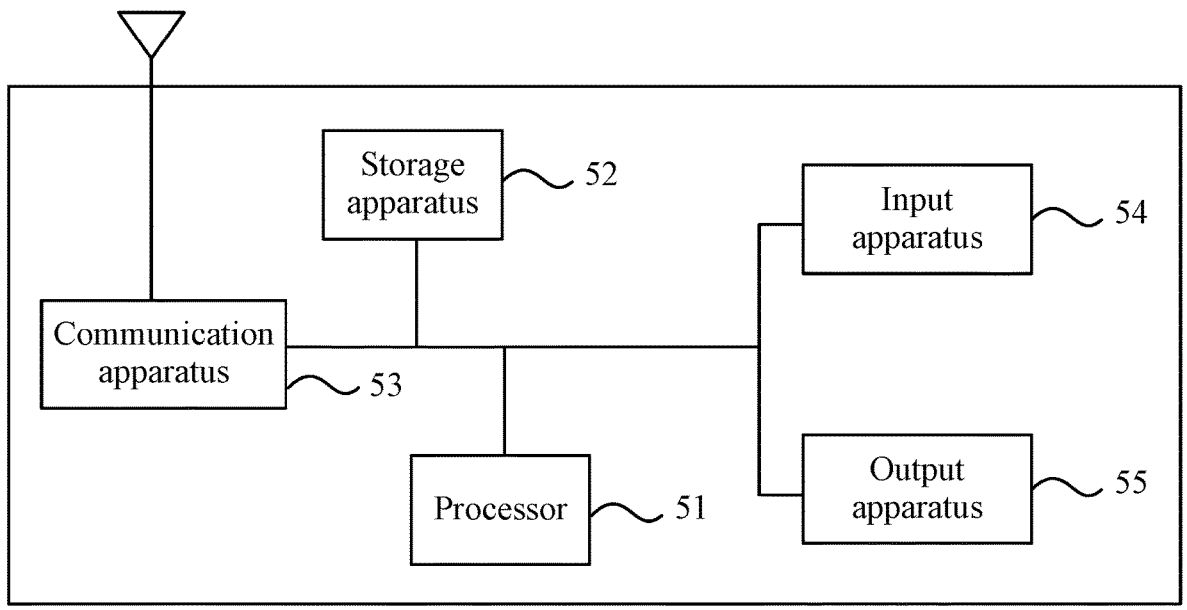
FIG. 5 is a diagram illustrating the structure of a device according to an embodiment of the present application.

The present application provides a device. FIG. 5 is a diagram of a device provided by the present application. As shown in FIG. 5, the device provided by the present application includes one or more processors 51 and a storage apparatus 52. The processor 51 in the device may be one or more. In FIG. 5, one processor is used as an example. The storage apparatus 52 is configured to store one or more programs. One or more programs are executed by one or more processors 51 so that one or more processors 51 may implement the method provided in FIG. 1 or FIG. 2 in the present application.

The apparatus also includes a communication apparatus 53, an input apparatus 54, and an output apparatus 55.

The processor 51, the storage apparatus 52, the communication apparatus 53, the input apparatus 54, and the output apparatus 55 in the device may be connected by a bus or otherwise. In FIG. 3, a bus connection is used as an example.

The input apparatus 54 may be configured to receive information of input figures or characters, as well as to generate key signal input related to user settings and functional control of the device. The output apparatus 55 may include a display device, such as a display screen.

The communication apparatus 53 may include a receiver and a sender. The communication apparatus 53 is set to send and receive information under the control of the processor 51. The information includes, but is not limited to, uplink grant information.

As a computer-readable storage medium, the storage device 52 may be set to store a software program, a computer-executable program, and modules, such as program instructions/modules corresponding to the authentication method provided in FIG. 1 of the present application (for example, the setting module 31, the acquisition module 32, the determination module 33, and the authentication module 34 in the authentication apparatus), or program instructions/modules corresponding to the authentication method provided in FIG. 2 of the present application (for example, the first sending module 41, the second sending module 42, and the third sending module 43). The storage device 52 may include a program storage area and a data storage area. The program storage area may store operating systems, and application programs required for at least one function. The data storage area may store data created according to use of the device, and the like. In addition, the storage device 52 may include a high-speed random-access memory, and may also include a non-volatile memory, such as at least one disk memory device, a flash memory device, or other non-volatile solid-state memory devices. In some examples, the storage device 52 may also include memories disposed remotely relative to the processor 51. The remote memories may be connected to the device through network. Examples of the above network include, but are not limited to, the Internet, an intranet, a local area network, a mobile communication network and combinations thereof.

The embodiment of the present application also provides a storage medium storing a computer program. The computer program is executed by the processor to implement the authentication method of the embodiment of the present application. The method includes setting at least one low-delay band and at least one non-low-delay band if an optical line terminal operates in at least two bands; after receiving a first serial number sent by the ONU or an auxiliary authentication device in the non-low-delay band, acquiring the equalization delay; after acquiring an authentication request sent by the ONU or the auxiliary authentication device in the non-low-delay band, determining the ONU identifier according to the first serial number or the second serial number of the ONU in the low-delay band sent by the ONU in the non-low-delay band; and authenticating the ONU according to the ONU identifier and the equalization delay.

Alternatively, when the computer program is executed by the processor, the authentication method of the embodiment of the present application is implemented. The method includes sending a first serial number to an optical line terminal in a non-low-delay band; sending an authentication request to the OLT in a non-low-delay band; and after receiving the equalization delay and the ONU identifier sent by the OLT, sending acknowledgement information to the OLT, where the ONU identifier is determined according to the first serial number or the second serial number of the ONU in the low-delay band, and the second serial number is sent by the ONU in the non-low-delay band.

The computer storage medium according to the embodiment of the present application may adopt any combination of one or more computer-readable media. The computer-readable medium may be a computer-readable signal media or a computer-readable storage medium. The computer-readable storage medium, for example, may be, but is not limited to, an electronic, magnetic, optical, electromagnetic, infrared or semiconductor system, apparatus or device or any combination thereof. More examples (a non-exhaustive list) of the computer-readable storage medium include electrical connections having one or more wires, portable computer disks, hard disks, random-access memories, read-only memories, erasable programmable read-only memories, flash memories, optical fibers, portable CD-ROMs, optical memory devices, magnetic memory devices, or any suitable combination thereof. The computer-readable storage medium may be any tangible medium containing or storing programs. The programs may be used by an instruction execution system, apparatus, or device, or any combination thereof.

A computer-readable signal medium may include data signals propagated in a baseband or as part of a carrier. Computer-readable program codes are carried in the data signals. The propagated data signals may be in multiple forms, and may include, but are not limited to, an electromagnetic signal, an optical signal or any suitable combination thereof. The computer-readable signal medium may also be any computer-readable medium except the computer-readable storage medium. The computer-readable medium may send, propagate or transmit programs used by or used in conjunction with an instruction execution system, apparatus or device.

The program codes contained on the computer-readable medium may be transmitted by any suitable medium, including, but not limited to, wireless, wire, fiber optic cable, radio frequency, and the like, or any suitable combination thereof.

The computer program codes for executing the present application may be written in one or more programming languages, including object-oriented programming languages such as Java, Smalltalk, C++, and conventional procedural programming languages such as "C" language or similar programming languages, or combinations thereof. The program codes may be executed entirely on a user computer, partly on a user computer, as a stand-alone software package, partly on a user computer and partly on a remote computer, or entirely on a remote computer or a server. In the case involving a remote computer, the remote computer may be connected to the user computer through any kind of network, including a local area network (LAN) or a wide area network (WAN), or may be connected to an external computer, for example, through the Internet using an Internet service provider.

The above are only example embodiments of the present application and are not intended to limit the scope of the present application.

It is to be understood by those skilled in the art that the term "user device" covers any suitable type of wireless user devices, for example, a mobile phone, a portable data processing apparatus, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented with the arrangement in which a data processor of a mobile apparatus performs computer program instructions. The implementation, for example, may be in a processor entity or in hardware, or in a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

The block views of any logic flow in drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random access memory (RAM), an optical memory apparatus and system (a digital video disc (DVD), or a compact disk (CD)). A computer-readable medium may include a non-transitory storage medium. The data processor may be in any type suitable for the local technical environment, for example, but not limited to, a general-purpose computer, a special-purpose computer, a microprocessor, a digital signal processing (DSP), an application specific integrated circuit (ASIC), a field-programmable gate array (FGPA), and a processor based on a multi-core processor architecture.

By way of exemplary and non-limiting examples, a detailed description of an example embodiment for the present application has been provided above. However, various modifications and adaptations to the above embodiment will be apparent to those skilled in the art when considered in connection with drawings and the claims, without departing from the scope of the present application. Accordingly, the appropriate scope of the present application will be determined according to the claims.

What is claimed is:

1. An authentication method, comprising:
in a case where an optical line terminal (OLT) operates in at least two bands, setting at least one low-delay band and at least one non-low-delay band;
after receiving, in a non-low-delay band of the at least one non-low-delay band, a first serial number sent by one of an optical network unit (ONU) or an auxiliary authentication device, acquiring an equalization delay;
after receiving, in the non-low-delay band, an authentication request sent by the ONU or the auxiliary authentication device, determining an ONU identifier according to the first serial number or a second serial number of the ONU in a low-delay band of the at least one low-delay band, wherein the second serial number is sent by the ONU in the non-low-delay band; and
authenticating the ONU according to the ONU identifier and the equalization delay.

2. The method of claim 1, wherein after receiving, in the non-low-delay band of the at least one non-low-delay band, the first serial number sent by the ONU, acquiring the equalization delay comprises:
after receiving, in the non-low-delay band, the first serial number sent by the ONU, sending a ranging request to the ONU; and
determining the equalization delay according to a time an upstream optical signal sent by the ONU is received and a time the ranging request is sent to the ONU.

3. The method of claim 2, wherein after receiving, in the non-low-delay band of the at least one non-low-delay band, the first serial number sent by the auxiliary authentication device, acquiring the equalization delay comprises:
after receiving, in the non-low-delay band, the first serial number sent by the auxiliary authentication device, sending a ranging request to the auxiliary authentication device; and
determining the equalization delay according to a time an upstream optical signal sent by the auxiliary authentication device is received and a time the ranging request is sent to the auxiliary authentication device.

4. The method of claim 1, wherein after receiving, in the non-low-delay band of the at least one non-low-delay band, the first serial number sent by the auxiliary authentication device, acquiring the equalization delay comprises:
after receiving, in the non-low-delay band, the first serial number sent by the auxiliary authentication device, sending a ranging request to the auxiliary authentication device; and
determining the equalization delay according to a time an upstream optical signal sent by the auxiliary authentication device is received and a time the ranging request is sent to the auxiliary authentication device.

5. The method of claim 1, wherein authenticating the ONU according to the ONU identifier and the equalization delay comprises:
periodically sending, in a low-delay band of the at least one low-delay band, the equalization delay and the ONU identifier generated according to the first serial number or the second serial number; and receiving acknowledgement information sent by the ONU.

6. The method of claim 5, after receiving the acknowledgement information sent by the ONU, the method further comprising:
after receiving a band switching request sent by the ONU, sending a band switching instruction to the ONU to enable the ONU to switch to a low-delay band of the at least one low-delay band according to the band switching instruction.

7. The method of claim 5, after receiving the acknowledgement information sent by the ONU, the method further comprising:
predeploying a protection passive optical network (PON) port, and in a case where no upstream optical signal is received within a preset time, switching a low-latency service to the protection PON port; or
predeploying a protection band, sending an identifier corresponding to the protection band to the ONU, and in a case where no upstream optical signal is received within a preset time, switching a low-latency service to the protection band.

8. The method of claim 1, wherein authenticating the ONU according to the ONU identifier and the equalization delay comprises:
sending, in a non-low-delay band of the at least one non-low-delay band, the ONU identifier and the equalization delay to the ONU; and
receiving acknowledgement information sent by the ONU.

9. The method of claim 1, further comprising:
in a case where no ONU response is received within a preset time, periodically sending a registration bandwidth;
after receiving an upstream optical signal sent by the ONU, determining whether a difference value between a receiving time of the upstream optical signal and an expected time is greater than a first threshold; and
in a case where the difference value between the receiving time of the upstream optical signal and the expected time is greater than the first threshold, adjusting the equalization delay.

10. The method of claim 9, wherein in the case where no ONU response is received within the preset time, periodically sending the registration bandwidth comprises:
in a case where no ONU response is received within a first preset time, sending the registration bandwidth in a first period; and
in a case where no ONU response is received within a second preset time, sending the registration bandwidth in a second period,
wherein the second preset time is greater than the first preset time, and the second period is greater than the first period.

11. A device, comprising:
at least one processor; and
a storage apparatus configured to store at least one program;
wherein the at least one processor is configured to execute the at least one program to perform the method of claim 1.

12. A non-transitory storage medium storing a computer program which, when executed by a processor, causes the processor to perform the method of claim 1.

13. An authentication method, comprising:
sending, in a non-low-delay band, a first serial number to an optical line terminal (OLT);
sending, in the non-low-delay band, an authentication request to the OLT; and
after acquiring an equalization delay and an optical network unit (ONU) identifier sent by the OLT, sending acknowledgement information to the OLT, wherein the ONU identifier is determined according to the first serial number or a second serial number of an ONU in a low-delay band, wherein the second serial number is sent by the ONU in the non-low-delay band.

14. The method of claim 13, after sending the acknowledgement information to the OLT, the method further comprising:
sending a band switching request to the OLT through a private message; or
sending the second serial number of the ONU in the low-delay band to the OLT through a private message.

15. The method of claim 13, after receiving the equalization delay and the ONU identifier sent by the OLT, the method further comprising:
writing the ONU identifier and the equalization delay into a power-down storage medium.

16. The method of claim 13, further comprising:
sending an upstream optical signal to the OLT after receiving a registration bandwidth.

17. The method of claim 13, further comprising:
in a case where no downstream optical signal is received within a preset time, switching a low-latency service to a protection band.

18. A device, comprising:
at least one processor; and
a storage apparatus configured to store at least one program;
wherein the at least one processor is configured to execute the at least one program to perform the method of claim 13.

19. A non-transitory storage medium storing a computer program which, when executed by a processor, causes the processor to perform the method of claim 13.

20. An authentication apparatus, comprising:
a setting module configured to, in a case where an optical line terminal (OLT) operates in at least two bands, set at least one low-delay band and at least one non-low-delay band;
an acquisition module configured to, after a first serial number sent by one of an optical network unit (ONU) or an auxiliary authentication device is received in a non-low-delay band of the at least one non-low-delay band, acquire an equalization delay;
a determination module configured to, after an authentication request sent by the ONU or the auxiliary authentication device is received in the non-low-delay band, determine an ONU identifier according to the first serial number or a second serial number of the ONU in a low-delay band of the at least one low-delay band, wherein the second serial number is sent by the ONU in the non-low-delay band; and
an authentication module configured to authenticate the ONU according to the ONU identifier and the equalization delay.

* * * * *